Figure 1:
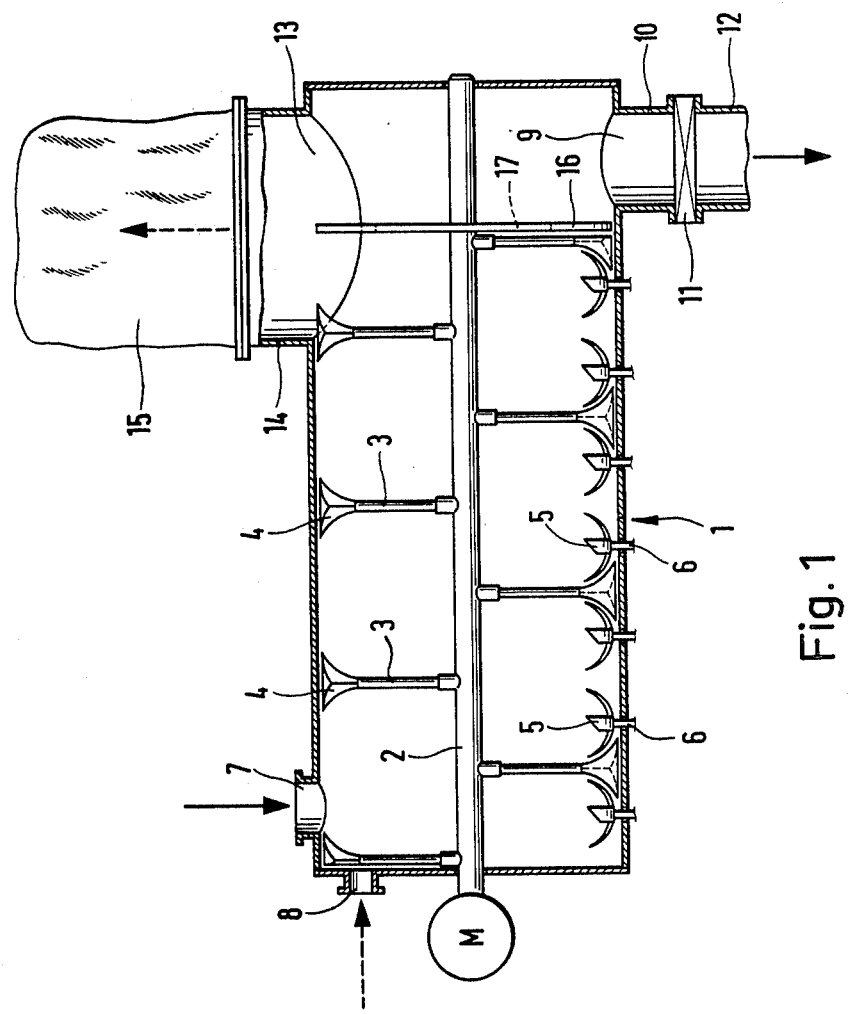

United States Patent [19]

Lücke et al.

[11] 4,214,376

[45] Jul. 29, 1980

[54] PROCESS AND APPARATUS FOR THE CONTINUOUS DRYING AND/OR GRANULATING OF LOOSE MATERIAL

[75] Inventors: Roland Lücke, Paderborn-Wewer; Eberhard Lipp, Paderborn, both of Fed. Rep. of Germany

[73] Assignee: Gerbruder Lodige Maschinenbau-Gesellschaft mbH, Fed. Rep. of Germany

[21] Appl. No.: 923,342

[22] Filed: Jul. 10, 1978

[30] Foreign Application Priority Data

Jul. 8, 1977 [DE] Fed. Rep. of Germany ....... 2730941
Jul. 8, 1977 [DE] Fed. Rep. of Germany ....... 2730942

[51] Int. Cl.³ .............................................. F26B 3/08
[52] U.S. Cl. .......................................... 34/10; 34/33; 34/57 D; 34/182; 366/291; 366/313
[58] Field of Search .............. 366/291, 292, 297, 313; 34/129, 180, 182, 57 A, 57 R, 57 D, 216, 217, 10, 22, 31, 33, 39

[56] References Cited

U.S. PATENT DOCUMENTS

| | | | |
|---|---|---|---|
| 575,983 | 1/1897 | Perky | 366/313 |
| 676,165 | 6/1901 | Wacker | 34/182 |
| 1,756,896 | 4/1930 | Wisner | 34/129 |
| 2,078,309 | 4/1937 | Bennett | 34/57 D |
| 2,220,193 | 11/1940 | Ahlmann | 34/57 D |
| 2,735,662 | 2/1956 | Wickland | 366/291 |
| 2,750,163 | 6/1956 | Loedige et al. | 366/313 |
| 3,145,017 | 8/1964 | Thomas | 366/313 |
| 3,360,865 | 1/1968 | Galle et al. | 34/182 |
| 3,646,689 | 3/1972 | Kuchenthal et al. | 34/57 D |

*Primary Examiner*—Larry I. Schwartz
*Attorney, Agent, or Firm*—Thomas J. Greer, Jr.

[57] ABSTRACT

A process and apparatus for the continuous drying and/or granulating of loose material. Loose material is conveyed through a drying/treating horizontal container by the action of a gas stream, the gas conveying force being opposed by a lesser, mechanical force derived from mixing tools within the container.

24 Claims, 8 Drawing Figures

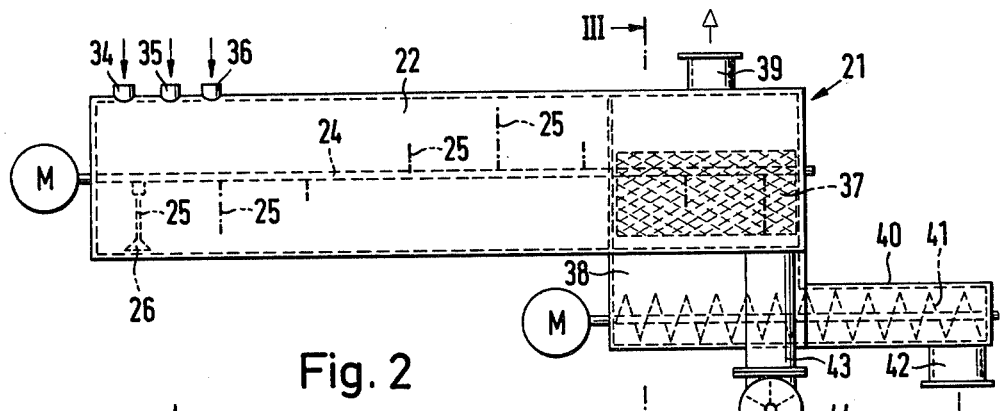
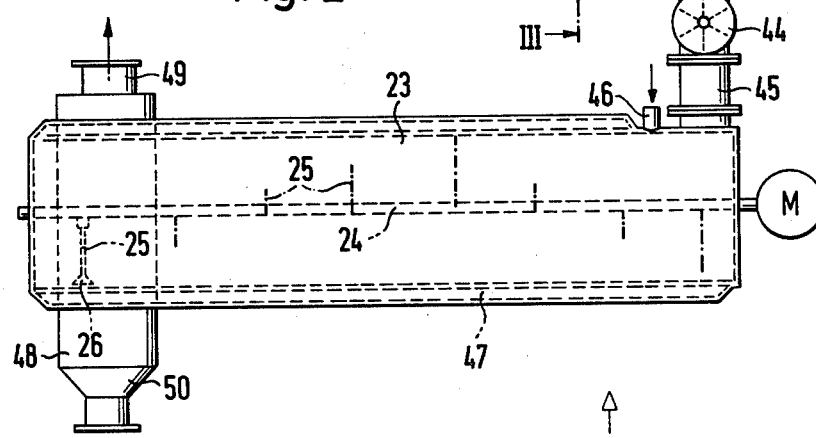
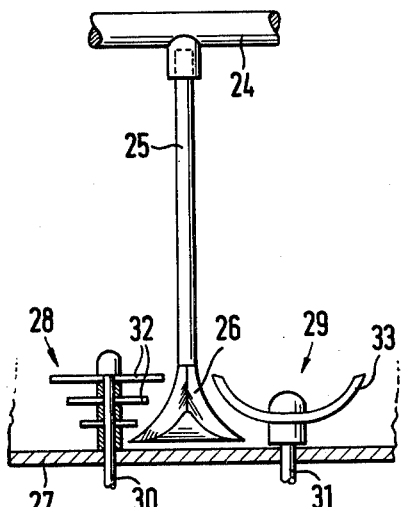
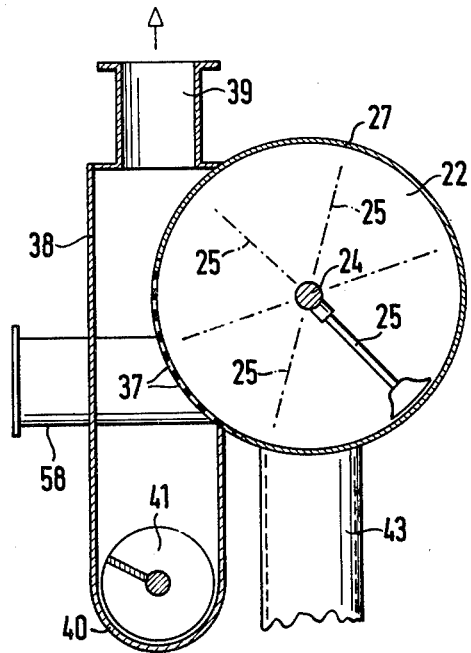

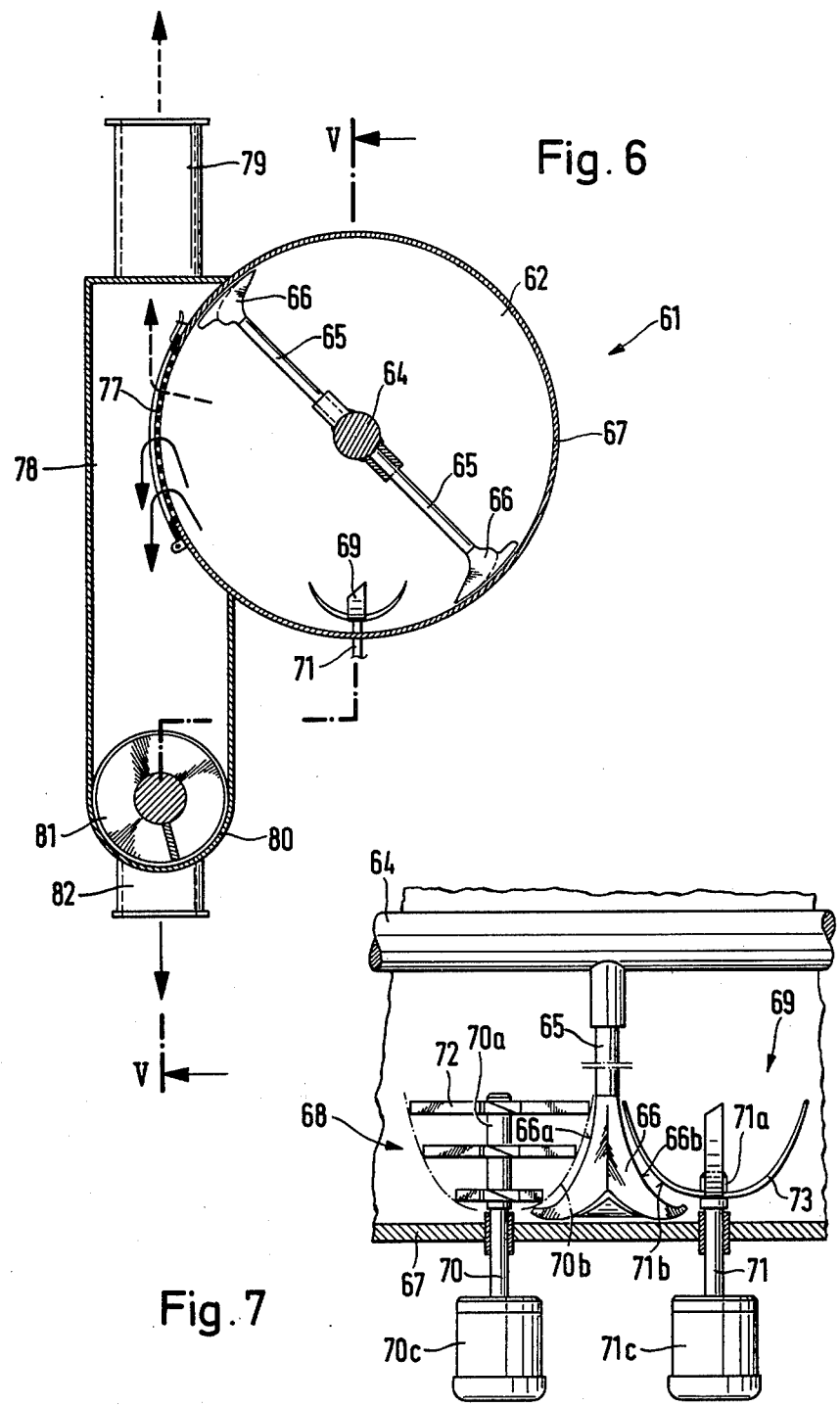

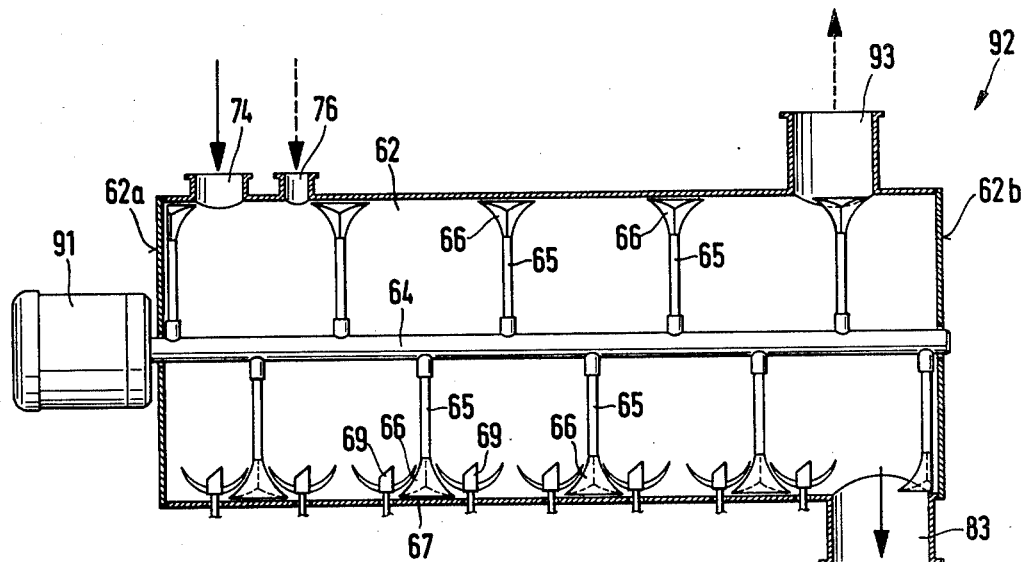
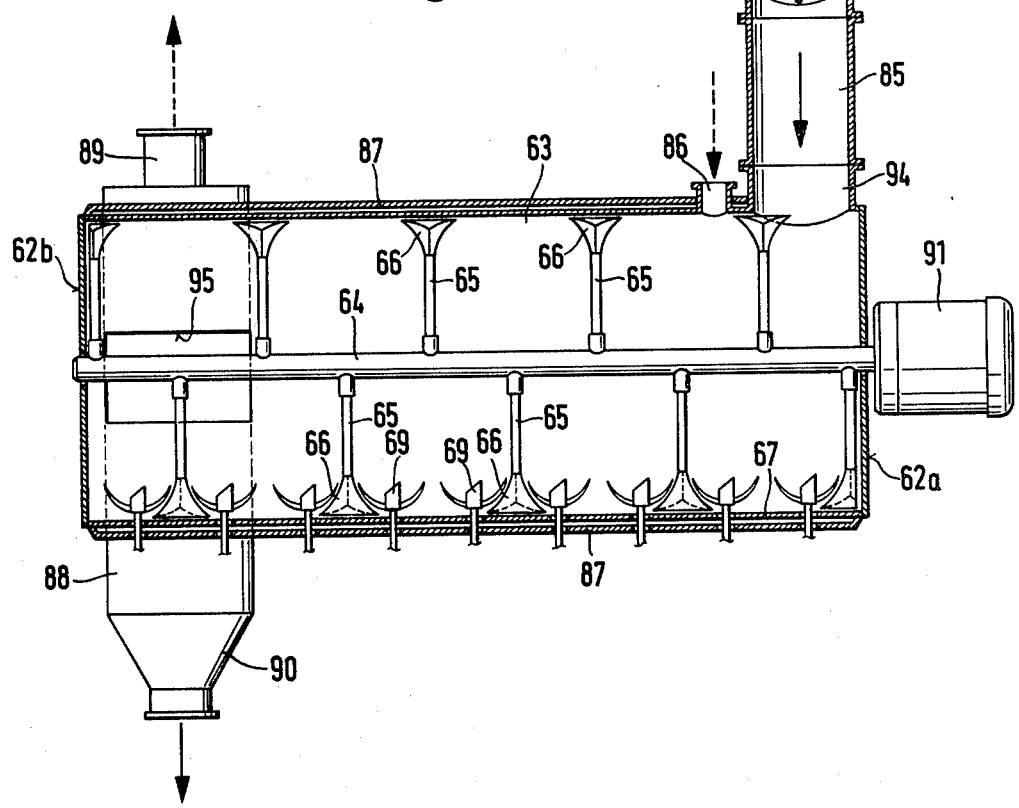
Fig. 8

PROCESS AND APPARATUS FOR THE CONTINUOUS DRYING AND/OR GRANULATING OF LOOSE MATERIAL

This invention relates to a process for the continuous drying of loose material, in which a gas such as air is blown through the material. It further relates to an apparatus for carrying out this process.

It is known to dry loose material batchwise in containers by supplying it with heat through the wall of the container. This may be carried out at atmospheric pressure or under a vacuum. The time required for drying is in all cases rather long even if the material is agitated during the drying process and thereby continuously rearranged so that different particles of the material come into contact with the heated wall of the container in turn and moisture can more easily escape from the mass of loose material. Moreover, with this method of drying, it is impossible to prevent the formation of hard lumps in the loose material if its moisture content is too high at the beginning of the drying process.

On the other hand, it is known to dry cereal grain by trickling it through a stream of hot air. Although loose material consisting of large particles, such as grain, can be partly dried by this method, the drying process and the degree of drying can only be regulated within very narrow limits. Loose material with a relatively high moisture content, in particular pasty and semi-liquid material, is virtually impossible to dry by this method because the individual parts of the bulk of the material do not have a sufficiently long dwell time in the drying air.

It is an object of the present invention to be able to regulate the dwell time of a loose material in a stream of gas and to adjust it to the necessary drying time in a continuous process of drying and/or granulating loose material by means of a gas such as, for example, air blown through the material.

According to the present invention, this problem is solved in a process of the type mentioned above by mechanically agitating the loose material inside a closed space while the gas used for drying is continuously blown through the agitated loose material at right angles to the direction of agitation and at the same time a conveying component of force which is smaller than the conveying component of force of the gas is continuously exerted on the loose material in a direction opposite to the flow of gas. In other words, the drying and/or granulating process takes place in such a manner that the material is distributed as finely and loosely as possible inside a closed space so that the drying air may sweep as uniformly as possible over every part and particle of the material and at the same time carry the material towards the outlet end of the drying chamber. However, in order to ensure a sufficiently long stay of the loose material in the drying chamber for the degree of drying required, without having to reduce the flow velocity of the gas used for drying, a conveying component of force opposing that exerted by the gas is exerted on the loose material while it is being agitated, with the result that the dwell time of the loose material inside the drying chamber is in fact longer than would be expected on the basis of the flow velocity of the gas. Since the drying effect of the gas does not depend only on its temperature but also on its velocity relative to that of the particles of the material to be dried, any reduction in the flow velocity of the gas effected with a view to increasing the dwell time of the material in the drying chamber would not increase the drying effect but only increase the treatment time. The conveying components of force acting on the agitated material in the drying chamber and opposing each other, at least one of which forces is preferably adjustable, enable the loose material continuously passing through the drying chamber to be dried and/or granulated very efficiently and uniformly to a predetermined and adjustable degree of drying within a relatively small drying space, so that optimum results are obtained within a minimum operating time.

In a preferred practical embodiment of the invention, this process is carried out in a cylindrical container having a mixer coaxially mounted therein, an inlet for fresh loose material and another inlet for drying air at one end of the container, and an outlet for exhaust air and another for dried loose material at the other end, said mixer comprising a central shaft with radial arms distributed round it and fixed thereto, each arm having a mixing tool mounted at its outer end, which mixing tool exerts a conveying component of force on the loose material both in the circumferential direction of the container and in the direction towards the inlet end of the container. The conveying component of force acting on the material against the direction of flow of the drying gas is thus produced mechanically by a mixing tool which throws up the loose material inside a mixing container and agitates it, the particles being preferably thrown in the general direction of the inlet end of the container. This thrust exerted on the particles of lose material can be adjusted according to the desired granulating or drying effect and it can also be adjusted to the particular material being dried. This adjustment may be effected once and for all by the manufacturer, but means may also be provided for readjusting the apparatus while it is in operation or at rest.

Practical tests have shown that drying of the products takes place at the cooling temperature limit, i.e. the temperature of the exhaust air is the same as the temperature of the dried product. This is an indication of highly efficient drying. In previously known drying processes, the temperature of the exhaust air is higher by at least 20 degrees Centigrade than the temperature of the dried product.

The apparatus according to the invention is also suitable for use as vacuum drier, for example for the recovery of solvents. In that case, the pneumatic conveying component of force is obtained by the pressure gradient of the evaporated solvent towards the discharge end.

When the apparatus is used for granulating, the degree to which the container is filled determines the particle size or diameter of the individual granules, and it may also be suitable to add liquid for moistening during the drying process.

Figure 5:
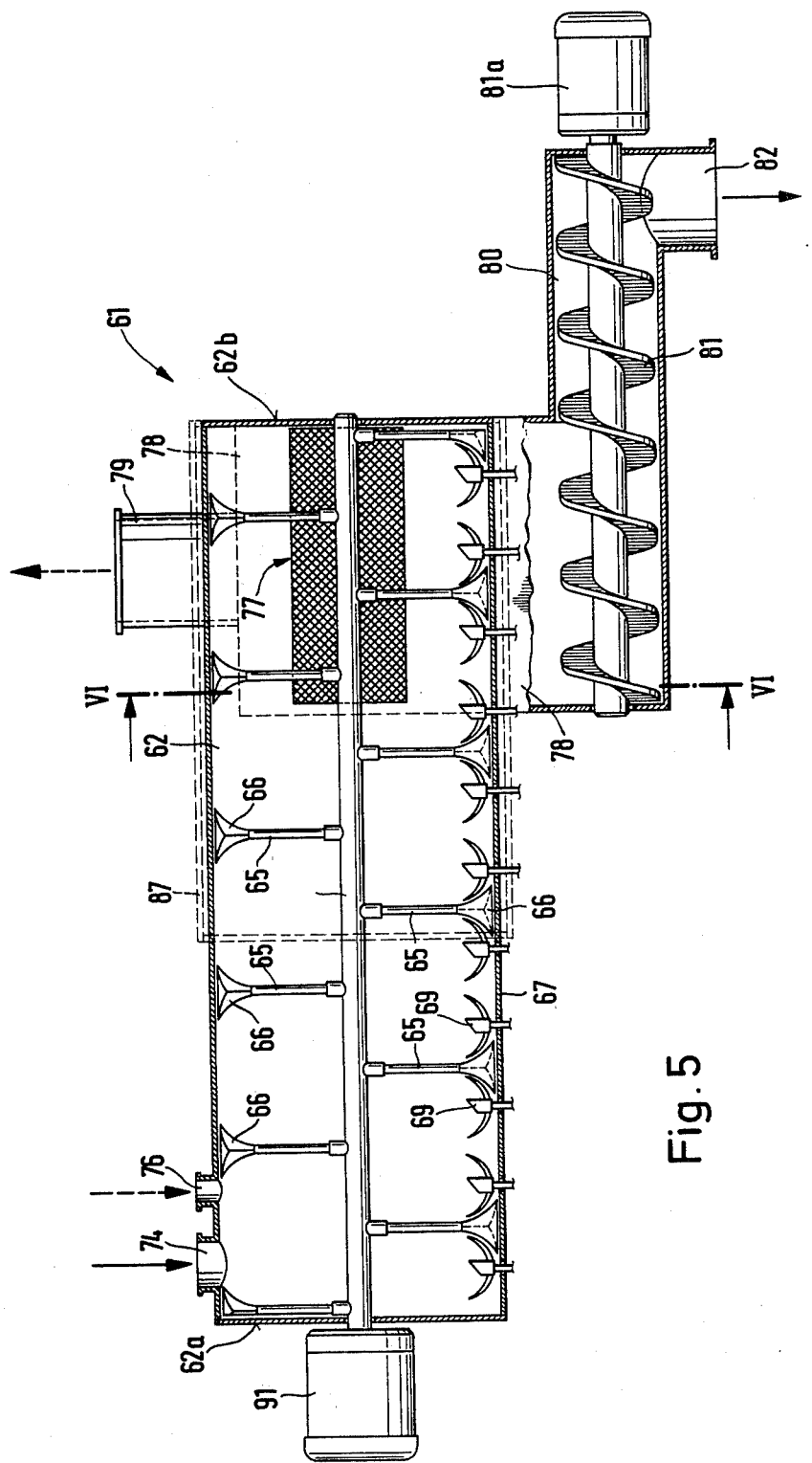

Embodiments of apparatus according to the invention are represented schematically by way of example in the accompanying drawings, in which FIG. 1 is a longitudinal section through a first embodiment of the apparatus, FIG. 2 shows a granulating drier comprising two containers as a second embodiment of the apparatus, FIG. 3 is a cross-section through the discharge end of the container represented in FIG. 2, FIG. 4 represents a detail from the inside of the upper container shown in FIG. 2, illustrating the ploughshare blades cooperating with the additional tools which are driven from outside the container wall, FIG. 5 is a longitudinal section through a third embodiment of the apparatus having a horizontal cylindrical container, FIG. 6 is an enlarged cross-section through the discharge end of the container of FIG. 5, FIG. 7 represents a detail from the inside of the container of FIG. 5, showing the agitator tools in the form of ploughshare blades cooperating with additional agitator tools which are driven from outside the container wall, and FIG. 8 is a longitudinal section through a fourth, modified embodiment of the apparatus having two horizontal containers arranged one above the other.

The apparatus for continuously drying or granulating loose material illustrated in FIG. 1 is operated at atmospheric pressure. It has a drum-shaped container 1 inside which is a mixer comprising a shaft 2 rotatably mounted in the longitudinal axis of the container 1 and arms 3 extending radially from said shaft 2. At the external end of each arm 3 is a mixing tool 4 in the form of ploughshares which are rotatable about the longitudinal axis of the arm 3 relative to said arm and can be fixed in their final position on the arm. Disintegrators 5 in the form of knives mounted on a shaft 6 which extends through the wall of the container are arranged between the individual mixing tools 4. This shaft 6 is driven by a motor (not shown).

At the inlet end of the container 1 is a socket 7 for the introduction of the loose material which is to be dried and a socket 8 for the input of air or some other gas suitable for drying, which may be heated before it is introduced through this socket. At the bottom of the opposite end of container 1 is an outlet aperture 9 with socket 10 connected thereto adapted to be closed by a closure member 11 which communicates with a discharge pipe 12 or some other device (not shown) for removing the dried material. At the top of container 1 is an outlet 13 for exhaust air opening into a short connecting piece 14 which is fitted with a filter bag 15 to remove any particles of loose material from the exhaust air before it escapes into the atmosphere.

Mounted inside the cylindrical container 1, below the outlet 13 for exhaust air and in front of the outlet 9 for dried loose material, is an annular disc 16 which serves as shutter to prevent loose material from being directly blown into the outlet 9. The diameter of the central aperture 17 of this annular disc 16 determines the degree to which the container 1 will be filled and hence to a certain extent also the dwell time of the material in the container.

If the drying effect of the gas blown through container 1 is not sufficient, container 1 may be provided with a wall heating (not shown), e.g. a double jacket through which heating medium flows.

If a cooling effect is desired, the gas blow through container 1 may be cooled, and the double walled jacket may also be used for cooling.

The granulating drier 21 illustrated in FIGS. 2 and 3 has two closed, cylindrical containers 22 and 23. Each container has a coaxial shaft 24 rotatably mounted therein and extending through the whole length thereof. This shaft 24 has a plurality of radial arms 25 distributed over its length and its circumference. Each arm 25 carries at its external end a tool 26 in the form of ploughshares situated near the wall 27 of the container 22 or 23, respectively, and partly sweeping over the surface of the wall 27 when the shaft 24 is in rotation. Additional tools 28 or 29, respectively, are mounted in the lower part of each container 22, 23 in those sections of the wall which are not swept by the tools 26. Each of these tools 28 and 29 has a shaft 30 or 31, respectively, extending through the wall 27 of the container at righangles to the shaft 24. Inside the container, each of these shafts 30 and 31 has tools 32 or 33 in the form of knife blades extending radially to the shaft 30 or 31, respectively, on which it is mounted and therefore at an angle to the lateral surfaces of the tools 26. The tool 28 consists of several straight knives mounted in several planes one above the other on the shaft 30 and differing in length, while the tool 29 carries knives 33 which are curved upwards at their ends. In both cases, the enveloping curve of the rotating tools 28 or 29 is adapted to the enveloping curves formed by the sides of the tools 26 between them, so that the material caught between these tools is pressed into granules which are then further compressed by the mechanical action of the subsequent tools.

The container 22 has three inlets 34, 35 and 36 arranged at its front end. The inlet 34 is provided for the input of product which is to be granulated, the inlet 35 for supplying the water used for moistening and the inlet 36 for the supply of hot air used for drying. The inlets 34 to 36 are only indicated schematically in the drawing and in practice are designed and arranged in relation to each other according to the requirements of the particular case.

At the rear end of the container, part of its side wall is in the form of a screen 37, and attached to this screen 37 on the outside of the container 22 is a vertical compartment 38 for exhaust air, which opens at the bottom into a horizontal conveyor channel 40 containing a conveyor screw 41 by which granulate entering compartment 38 through the screen 37 is conveyed to an outlet pipe 42.

Instead of the screen provided for discharge, a short tangential pipe 58 may be provided at the rear end of the container 22 for discharging the material into a cyclone (not shown) where the dried solid material is separated from the exhaust air.

According to an alternative embodiment, the bottom of the rear end of the container 22 has attached to it a descending outlet pipe 43 which contains an outlet valve 44 and opens into an inlet pipe 45 leading to the second container 23. In this embodiment, the pipe 39 provided for the discharge of exhaust air is directly mounted on the container 22.

Container 23 is similar to container 22. In particular, it contains a shaft 24 with radial arms 25 and ploughshare blades 26 mounted thereon as well as tools 28 and 29. An air inlet 46 is in this case provided next to the inlet pipe 45 because the hot air flowing through container 22 should not also pass through the container 23, it being preferred to pass fresh hot air through container 23.

The container 23 has a double wall 47 so that it can be externally heated or cooled. Drying in the container 23 can thereby be accelerated since not only is hot air blown through the material inside the container but the agitated material can also be heated by contact as it is thrown against the heated wall of the container.

Situated on the external surface of the outlet end of the container 23 is a vertical compartment 48 which may contain a cyclone to separate exhaust air from dried granulate, but it may also be constructed in the same manner as compartment 38. At the top of compartment 48 is a pipe 49 for the discharge of exhaust air while the lower end 50 of the compartment is in the form of a funnel for the discharge of dried granulate.

The opening of the container 23 into the compartment 48 may be equipped with a screen (not shown) in a manner similar to that described above for the opening of container 22.

The shafts 24 of containers 22 and 23 are driven at such a speed that Froud's number is in the region of from 1 to 3.5 so that the material in the containers is swirled up and repeatedly thrown against the internal walls of containers 22 and 23, thereby ensuring that all parts of the material will make uniform contact with the hot air sweeping through the container, and the material will not collect at the bottom or in the lower part of the container as this would impair the transfer of heat both from the hot gas and from the wall of the container, if this is also heated.

This apparatus enables both dry and moist loose material to be granulated in a single passage through a closed apparatus, the granulate consisting of smooth edged grains or granules of the desired size (at the end of the granulating and drying process) and having a bulk density of over 500 kg/m$^3$, which is greater than has hitherto been obtainable. Any further operation to reduce the size of the granules after the granulating and drying process is not necessary.

The embodiment illustrated in FIGS. 2 to 4 is particularly suitable for granulating carboxymethylcellulose (CMC) and in particular sodium carboxymethylcellulose, as will be described in the following Example.

EXAMPLE

Fibrous CMC was continuously delivered from a silo to a granulating drier illustrated in FIGS. 2 to 4. The CMC was first moistened to a water content of from 25 to 80%, preferably from 30 to 45%. The moistened material was then compressed by the action of the ploughshare blades on the shaft of the drier cooperating with the disintegrating tools mounted in the wall of the container, which tools consisted of knives mounted radially on a rotatable shaft which extended at rightangles to the axis of the container. At the same time, the material thus swirled up by the ploughshare blades was dried by hot air passing through it. The finished granulate had a residual moisture content of 5%. To accelerate drying, the granulating drier was heated by means of a double walled jacket at the rear or by means of heating coils fixed externally to its drum shaped container. The granulate was dried by heat of convection alone until its moisture content had been reduced to 18–45% and only then was the additional wall heating put into operation because at a higher moisture content the material is liable to stick to the wall of the container, in which case heat could hardly be transferred from the heated wall to the remainder of the material in the container. At the same time, the accumulations on the wall of the container was liable to be damaged by heat and may therefore harden. These incrustations on the wall break off from time to time and contaminate the rest of the material.

The hot air used for drying was passed through the granulating drier in the same direction as the material to be dried.

The material was granulated by means of the ploughshare blades continuously passing portions of the material between the individual additional tools rotating at a speed of 3000 revs/min attached to the wall of the container. The enveloping curves of these additional tools and those of the ploughshare blades are so adjusted with respect to each other that they virtually coincide. Since, however, the concave sides of the ploughshare blades do not cooperate with a countersurface but with knife-like tools set at an angle to them, the material does not get sequeezed but only compressed so that a granulate is formed.

The individual granules were surface dried by the heat of the hot air. This resulted in the formation of a sort of outer skin on the particles enclosing a still flexible core. By providing a suitable number of interacting tools through which the material must pass before being discharged from the granulating drier, it was ensured that each granule was compressed several times on its way through the drier and thereby further compacted. The granules finally had a diameter of from 0.1 to 4 mm.

The dried 61 illustrated in FIGS. 5 and 6 has a horizontally mounted closed cylindrical container 62. A shaft 64 extending coaxially through the whole length of the container 62 is rotatably mounted in the end walls 62a and 62b of said container and is connected to a motor 91 by which it is driven. In the particular example illustrated, this motor 91 is situated outside the end wall 62a, but it could equally well be arranged at the other end of the container 62.

The shaft 64 carries a plurality of radial arms 65 distributed over its length and its circumference. Each arm 65 carries at its outer end an agitator tool 66 in the form of ploughshares which are situated close to the wall 67 of the container 62 and move close to this wall when the shaft 64 is in rotation. The agitator tools 66 are provided in such numbers, and fixed to the shaft 64 at such distances apart, that they sweep over a substantial part of the wall 67 of the container but leave annular strips of wall untouched between the separate areas over which they sweep.

Additional agitator tools 68 and 69 are provided in the lower region of container 62, between successive ploughshare tools 66. Each of these additional tools 68 and 69 comprises a shaft 70 or 71, respectively, extending through the wall 67 of the container at rightangles to the shaft 64, with tools 72 or 73, respectively, in the form of knives mounted radially on each of these shafts 70 and 71 inside the container and hence extending at an angle to the lateral surfaces of the other tool. The tool elements 72 on the agitator 68 comprise straight knives mounted one above another in several planes on the shaft 70 or on a hub 70a on the shaft, which knives differ in length according to the form of the sides of agitator tool 66. The agitator tool 69 carries a layer of knives 73 which are curved upwards at their ends and preferably mounted to intersect with each other on a hub 71a. In both cases, the enveloping curve, 70b or 71b, respectively, is adapted to the enveloping curve formed by the sides 66a and 66b of the agitator tool 66, and the two enveloping curves are close together so that the agitator tools 66 cooperate with the agitator tools 68 or 69, respectively, in the lower region of the container to act on the material which is being dried.

The container 62 contains either agitator tools 68 or agitator tools 69, i.e. these two embodiments of agitator tools are generally not present together in one and the same drier.

An inlet 74 for the material to be dried is arranged at the front end of the container 62, in the upper part of the cylindrical side wall. This inlet has only been indicated schematically in the drawing and may be in the form of a feed hopper with or without a built in shutter such as a charging valve. The inlet 74 may also be situated in the end wall 62a. An inlet 76 for the supply of hot air for drying is provided at the front end of container 62. This inlet 76 has also only been indicated schematically and may be connected, for example, through a pipe or flexible tube, to a blower (not shown) or a source of hot air (also not shown). The inlet 16 may also be situated at any point at the front end of container 2 but is preferably arranged so that, viewed in the longitudinal direction of the container, it is behind the inlet 14 so that hot air enters the container 2 at a point where the material to be dried has already come under the action of agitator tools 66 and possibly also tools 68 or 69.

At the rear end of the cylindrical wall 67 of the container 62 is a screen 77 which extends over part of the circumference and in the longitudinal direction of the container 62. On the outside of container 62, the screen 77 is adjacent to a vertical compartment 78 which has a pipe 79 for exhaust air at the top and a horizontal conveyor channel 80 containing a conveyor screw 81 at the bottom, by which dried material entering the compartment 78 through the screen 77 is conveyed to a downwardly directed outlet pipe 82. The conveyor screw 81 is designed to be driven by a motor 81a attached to it. Instead of the material being discharged through the screen 71, a horizontal discharge pipe may be provided on the container 61 to lead into a cyclone (not shown) for separating dried material from exhaust air.

As indicated in FIG. 5, the rear part of the container 62 may be provided with a double walled jacket 87 (only indicated in the drawing) through which heating medium may flow, as will be described in more detail with reference to FIG. 8.

The drier 92 illustrated in FIG. 8 differs from the drier 61 of FIG. 5 in having two cylindrical containers 62 and 63 arranged one above the other. Container 62 is substantially identical to container 62 of the drier 61 of FIGS. 5 and 6, including its various installations, only the rear end being different in that it has a pipe 93 for the discharge of air, which pipe may be equipped with a filter (not shown) to prevent the removal of dried material with the exhaust air. Moreover, a downpipe 83 ending in an air valve 84 is provided at the rear end of the container 62.

The air valve 84 opens into a down pipe 85 which is connected to an inlet pipe connection 94 at the front end of the container 63.

Container 63 is similar to container 62, i.e. it comprises a cylindrical side wall 67 and circular end walls 62a and 62b. It contains a rotatably mounted shaft 64 with arms 65 carrying agitator tools 66 in the form of ploughshares, driven by a motor 91. Additional agitator tools 68 or 69 are arranged in the lower part of container 63, between the pathways of the agitator tools 66, in the same manner as in the embodiment illustrated in FIGS. 5 and 6 and as shown in detail in FIG. 7.

An inlet 86 for hot air similar to the inlet 76 of container 22 and also connected to a source of hot air is provided at the front or inlet end of container 63, next to the pipe 94. The hot air used for drying is therefore not transferred from container 62 to container 63 but container 63 is supplied with fresh hot air.

Container 63 has a double walled jacket 87 through which heating medium may flow from the front to the rear end of the container to heat the container 3 from outside. The contents of container 63 are thus dried through the wall 67 of the container as well as with hot air so that drying is accelerated.

At the outlet end of the container 63, on the outside thereof, is a vertical compartment 88 which may contain a cyclone to separate exhaust air from dried material. Alternatively, the compartment 88 may have the same construction as compartment 78 of the example illustrated in FIGS. 5 and 6. It is provided with an exhaust air pipe 89 at the top while its lower end 90 is in this particular example in the form of a funnel for the direct removal of dried material. An aperture 95 in the wall 67 of the container 63 opens into the compartment 88. This aperture 95 has been shown open but it may be covered with a screen.

Instead of providing a double walled jacket 87 on the outside of the container, heating coils may be provided to carry heating medium.

In this embodiment, the material introduced through the inlet 74 is dried in two sections and yet continuously. In the second section, consisting of container 63, drying is more intensive than in the first section because the material already partly dried in the first section is subjected to a fresh supply of hot air and because the container 63 is also heated through the wall 67. The air valve 84 between the two containers provides for continuous transfer of the material being dried from container 62 to container 63 but prevents transfer of the air used for drying in container 62 to the container 63 and ensures that fresh hot air introduced into container 63 under pressure will not leak into container 62.

The shafts 64 in containers 62 and 63 are driven at such a speed that the material in the containers is repeatedly thrown up and swirled up by the agitator tools 66 and the particles also impinge against the side wall 67 in the upper regions of containers 62 and 63. This ensures that the material to be dried will be exposed extremely uniformly to hot air. In the container 63, the fact that particles of material being dried also impinge against the upper regions of the wall 67 ensures optimum transfer to them of the additional drying heat provided by external heating to the material. It also prevents unduly prolonged stay of material at the bottom of container 3, which would be liable to cause localised overheating by the hot wall and inefficient transfer of heat to the material.

The invention enables moist, pasty or pulpy loose material to be dried and/or granulated in a single passage through a closed apparatus in which the degree of drying of the material obtained at the outlet end of the apparatus can be regulated by the heat put in and the dwell time of the material in the drier. The material leaving the drier is uniform and of a loose, pourable consistency and does not require any after-treatment as a result of the drying process.

We claim:

1. A process for the continuous drying and/or granulating of loose material located within a closed chamber comprising the steps of:

continuously blowing a gas such as air as a drying medium through the loose material simultaneously with the material being mechanically swirled up inside of said closed chamber, said gas being blown in a direction transverse to that in which the material is being swirled up to provide a conveying force for moving the material through said chamber;

the improvement comprising:

subjecting said material to a mechanical conveying force as it is swirled up, said mechanical conveying force being smaller than and in a direction opposite to that in which the material is conveyed by said gas force.

2. The process according to claim 1, wherein at least one of the said two mentioned opposing conveying forces is adjustable.

3. The process according to claim 1 or claim 2, wherein the loose material is alternately mechanically compressed and decompressed in a continuously moving stream and, at the same time, heated in order to be dried.

4. The process according to claim 1 wherein the loose material is at least partly heated by convection.

5. The process according to claim 4, wherein hot air is passed through the loosened material to heat it.

6. The process according to claim 1 wherein the loose material is moistened to a water content of from 26 to 80%, before it is compressed and dried.

7. The process according to claim 6, wherein the loose material is moistened to a water content of from 30 to 45% before it is compressed and dried.

8. The process according to claim 1, wherein the loose material is dried in a two-stage drying process, the loose material being dried in the first stage by heat supplied by convection and in the second stage by heat of contact.

9. An apparatus for the continuous drying and/or granulating of loose material, the apparatus including,
(a) at least one substantially horizontal cylindrical container whose diameter is small compared with its length;
(b) an inlet for loose material to be dried and/or granulated at one end and an outlet for dried material at the other end of the container;
(c) a shaft rotatably mounted coaxially in the container and attached to a drive the shaft carrying radial arms distributed over its length and circumference, the radial arms carrying agitator tools in the form of blades extending close to the wall of the container, which tools throw loose material in the radial direction of the container and transport loose material in the longitudinal direction of the container;
(d) additional agitator tools, each of which comprises a tool shaft extending substantially radially through the wall of the container and connected to a drive, which tool shaft carries tools extending in its radial direction, the enveloping curves generated by the said additional tools during their rotation being adapted to the enveloping curves of the agitator tools rotating between them and almost coinciding with said enveloping curves, the additional agitator tools arranged in the lower region of the container, between the separate pathways swept by the agitator tools which are mounted on the said shaft extending coaxially through the container;
(e) an inlet for drying air supplied under pressure provided at one end of the container and an outlet for air at the other end.

10. The apparatus according to claim 9, wherein the component of thrust of the agitator tools in the circumferential direction of the container is greater than that in the longitudinal direction thereof.

11. The apparatus according to claim 9 or 10, wherein the individual mixing tools are set at an angle to the longitudinal axis of the container.

12. The apparatus according to claim 11, characterised in that the setting angle of the mixing tools in adjustable.

13. The apparatus according to either claim 9 or 10, wherein the mixing tools are in the form of ploughshares.

14. The apparatus according to claim 9, wherein the container has an annular shutter for holding back the material conveyed through the container, which shutter is situated in front of the outlet aperture provided for the discharge of treated material in the bottom of said container.

15. The apparatus according to claim 14, wherein the outlet for exhaust air is situated above the shutter.

16. The apparatus according to claim 9, wherein an outlet aperture is covered by a screen arranged at the outlet end of the container in the cylindrical wall thereof, which outlet aperture opens into a substantially vertical compartment arranged on the outside of the container, which compartment has an outlet for air at its upper end and an outlet for dried material at its lower end.

17. The apparatus according to claim 16, wherein the outlet for dried material opens into a conveyor screw.

18. The apparatus according to claim 9, wherein the container is equipped over at least part of its length with means for heating the container wall.

19. The apparatus according to claim 18, wherein the means for heating the wall is situated in the rear part of the container.

20. The apparatus according to claim 9, including a second, similar horizontal container, the rear end of the first container being connected to the front end of the second container through a downpipe.

21. The apparatus according to claim 20, characterised in that the first container has an air discharge to the outside arranged at its rear end and the second container has an inlet for hot air under pressure, which inlet is separated from the downpipe.

22. The apparatus according to claim 20 or claim 21, wherein an air valve is arranged in the downpipe.

23. The apparatus according to claim 22, wherein the second container is provided with a wall heating means over virtually its whole length.

24. The apparatus according to claim 9, wherein the inlet and outlet for drying air are situated at the same end of the container or part of the container as the inlet and outlet for the material to be treated.

* * * * *